US009361576B2

(12) United States Patent
Lee et al.

(10) Patent No.: US 9,361,576 B2
(45) Date of Patent: Jun. 7, 2016

(54) NEUROMORPHIC SIGNAL PROCESSING DEVICE AND METHOD FOR LOCATING SOUND SOURCE USING A PLURALITY OF NEURON CIRCUITS

(71) Applicant: SAMSUNG ELECTRONICS CO., LTD., Suwon-si (KR)

(72) Inventors: Kyoobin Lee, Seoul (KR); Hyun Surk Ryu, Hwaseong-si (KR); Jun Haeng Lee, Hwaseong-si (KR); Keun Joo Park, Seoul (KR); Chang-Woo Shin, Hwaseong-si (KR); Jooyeon Woo, Seoul (KR)

(73) Assignee: SAMSUNG ELECTRONICS CO., LTD., Suwon-si (KR)

(*) Notice: Subject to any disclaimer, the term of this patent is extended or adjusted under 35 U.S.C. 154(b) by 550 days.

(21) Appl. No.: 13/912,667

(22) Filed: Jun. 7, 2013

(65) Prior Publication Data

US 2013/0329524 A1    Dec. 12, 2013

(30) Foreign Application Priority Data

Jun. 8, 2012 (KR) ........................ 10-2012-0061608

(51) Int. Cl.
*G06N 3/04* (2006.01)
*G06N 3/063* (2006.01)

(52) U.S. Cl.
CPC ................ *G06N 3/049* (2013.01); *G06N 3/063* (2013.01)

(58) Field of Classification Search
CPC .......... G06N 3/04; G06N 3/049; G06N 3/063
USPC ........... 700/48, 47, 50, 28, 49, 52, 29, 51, 30,
700/31, 44, 54, 286, 291, 110, 121, 2, 32,
700/45, 55, 112, 267, 42, 53, 9, 1, 108, 109,
700/117, 12, 17, 173, 19, 245, 253, 266,
700/272, 287, 36, 40, 46, 5, 65, 66, 69, 83,
700/104, 106, 116, 119, 128, 13, 16, 186,
700/20, 200, 201, 22, 249, 250, 255, 258,
700/259, 273, 274, 275, 289, 290, 292, 293,
700/297, 299, 3, 33, 41, 43, 61, 67, 72, 82,
700/89, 90, 95; 706/15, 14, 16, 2, 13, 20, 6,
706/12, 21, 23, 25, 26, 4, 45, 903, 1, 19, 3,
706/30, 44, 46, 47, 48, 5, 56, 912, 913, 10,
706/17, 18, 22, 31, 41, 52, 59, 61, 8, 904,
706/905; 701/59, 60, 27, 3, 44, 57, 1, 10,
701/33.1, 4, 40, 400, 408, 424, 481, 521,
701/524, 58, 102, 103, 11, 2, 23, 31.4, 32.9,
701/36, 46; 703/2, 6; 382/155, 118, 159,
382/160, 100, 103, 104, 105, 107, 156, 190,
382/224, 260; 702/182, 185, 179, 188, 189,
702/196, 104, 116, 183, 184, 190, 31, 32,
702/57, 58, 60
See application file for complete search history.

(56) References Cited

U.S. PATENT DOCUMENTS 8,426,793 B1 * 4/2013 Barrows ................. H04N 5/359
250/208.1
2008/0262834 A1    10/2008  Obata et al.

FOREIGN PATENT DOCUMENTS

JP          05-087903 A    4/1993
JP          2009-236688 A  10/2009
(Continued)

*Primary Examiner* — Luke Ratcliffe
*Assistant Examiner* — Amienatta M Ndure Jobe
(74) *Attorney, Agent, or Firm* — Sughrue Mion, PLLC (57) ABSTRACT

Provided is a neuromorphic signal processing device for locating a sound source using a plurality of neuron circuits, the neuromorphic signal processing device including a detector configured to output a detected spiking signal using a detection neuron circuit corresponding to a predetermined time difference, in response to a first signal and a second signal containing an identical input spiking signal with respect to the predetermined time difference, for each of a plurality of predetermined frequency bands, a multiplexor configured to output a multiplexed spiking signal corresponding to the predetermined time difference based on a plurality of the detected spiking signals output from a plurality of neuron circuits corresponding to the plurality of frequency bands, and an integrator configured to output an integrated spiking signal corresponding to the predetermined time difference, based on a plurality of the multiplexed spiking signals corresponding to a plurality of predetermined time differences.

20 Claims, 7 Drawing Sheets

(56) References Cited

FOREIGN PATENT DOCUMENTS

| | | |
|---|---|---|
| JP | 2010-175431 A | 8/2010 |
| KR | 10-2003-0046727 A | 6/2003 |
| KR | 10-2006-0049941 A | 5/2006 |
| KR | 10-2009-0017208 A | 2/2009 |
| KR | 10-2009-0044314 A | 5/2009 |
| KR | 10-2010-0129741 A | 12/2010 |

* cited by examiner

FIG. 7

NEUROMORPHIC SIGNAL PROCESSING DEVICE AND METHOD FOR LOCATING SOUND SOURCE USING A PLURALITY OF NEURON CIRCUITS

CROSS-REFERENCE TO RELATED APPLICATION

This application claims priority from Korean Patent Application No. 10-2012-0061608, filed on Jun. 8, 2012, in the Korean Intellectual Property Office, the disclosure of which is incorporated herein by reference in its entirety for all purposes.

BACKGROUND

1. Field

The following description relates to a neuromorphic signal processing device and method that may locate a sound source using a plurality of neuron circuits.

2. Description of the Related Art

A human may detect a direction of a sound using a difference in times at which the sound arrives at both ears. Digital audio signal processing is used in most technologies currently being used for robots or security cameras.

For example, in order to measure a time difference of a sound detected using a plurality of microphone arrays, a Fourier transform may be performed on the detected sound and phase components in multiple frequency bands may be extracted.

In such a method, an analog-to-digital converter which performs digital conversion and a processor for processing the Fourier transform, as well as other types of components, may be used.

SUMMARY

According to exemplary embodiments, there is provided a neuromorphic signal processing device for locating a sound source using a plurality of neuron circuits, the device including a detector configured to output a detected spiking signal using a detection neuron circuit corresponding to a predetermined time difference, in response to a first signal and a second signal containing an identical input spiking signal with respect to the predetermined time difference, for each of a plurality of predetermined frequency bands, a multiplexor configured to output a multiplexed spiking signal corresponding to the predetermined time difference based on a plurality of the detected spiking signals output from a plurality of neuron circuits corresponding to the plurality of frequency bands, and an integrator configured to output an integrated spiking signal corresponding to the predetermined time difference, based on a plurality of the multiplexed spiking signals corresponding to a plurality of predetermined time differences. The predetermined time difference may correspond to one of the plurality of predetermined time differences.

The first signal and the second signal may be generated simultaneously from an identical sound source.

The device may further include an input unit configured to receive the first signal and the second signal, to generate a plurality of input spiking signals corresponding to the plurality of frequency bands based on the first signal, and to generate another plurality of input spiking signals corresponding to the plurality of frequency bands based on the second signal.

The detection neuron circuit may include a delay neuron circuit configured to delay an input spiking signal included in the first signal to thereby delay the first signal for a time period corresponding to the predetermined time difference, and a coincidence detection neuron circuit configured to output the detected spiking signal when the delayed first signal and the second signal contain the identical input spiking signal at an identical point in time.

The multiplexor may output the multiplexed spiking signal using a multiplexing neuron circuit corresponding to the predetermined time difference.

The integrator may output the integrated spiking signal using an integration neuron circuit corresponding to the predetermined time difference.

The integrator may receive the multiplexed spiking signal corresponding to the predetermined time difference through an excitatory synapse, and receive multiplexed spiking signals corresponding to time differences other than the predetermined time difference through an inhibitory synapse in order to output the integrated spiking signal corresponding to the predetermined time difference.

The integrator may be connected, through the inhibitory synapse, more strongly to a multiplexed spiking signal corresponding to a time difference which is relatively distant from the predetermined time difference as compared to a multiplexed spiking signal corresponding to a time difference which is relatively close to the predetermined time difference, among the time differences other than the predetermined time difference.

Each of a plurality of the integrated spiking signals corresponding to the plurality of time differences may be mapped to a direction of the sound source.

The plurality of frequency bands may correspond to frequency bands within an audible frequency band.

Each of the plurality of neuron circuits may include a neuron circuit using a leaky integrate-and-fire (LIF) model.

According to other exemplary embodiments, there is also provided a neuromorphic signal processing method of locating a sound source using a plurality of neuron circuits, the method including outputting a detected spiking signal using a detection neuron circuit corresponding to a predetermined time difference, in response to a first signal and a second signal containing an identical input spiking signal with respect to the predetermined time difference, for each of a plurality of predetermined frequency bands, outputting a multiplexed spiking signal corresponding to the predetermined time difference, using a multiplexing neuron circuit corresponding to the predetermined time difference, based on a plurality of the detected spiking signals output from a plurality of neuron circuits corresponding to the plurality of frequency bands, and outputting an integrated spiking signal using an integration neuron circuit corresponding to the predetermined time difference, based on a plurality of the multiplexed spiking signals corresponding to a plurality of predetermined time differences. The predetermined time difference may correspond to one of the plurality of predetermined time differences.

The outputting of the integrated spiking signal may include outputting the integrated spiking signal corresponding to the predetermined time difference using a synapse scheme of receiving a multiplexed spiking signal corresponding to the predetermined time difference through an excitatory synapse, and receiving multiplexed spiking signals corresponding to time differences other than the predetermined time difference through an inhibitory synapse.

The outputting of the integrated spiking signal may include using the synapse scheme of connecting, through the inhibitory synapse, an integrator more strongly to a multiplexed spiking signal corresponding to a time difference which is relatively distant from the predetermined time difference as compared to a multiplexed spiking signal corresponding to a time difference which is relatively close to the predetermined time difference, among the time differences other than the predetermined time difference.

Other features and aspects will be apparent from the following detailed description, the drawings, and the claims.

Throughout the drawings and the detailed description, unless otherwise described, the same drawing reference numerals will be understood to refer to the same elements, features, and structures. The relative size and depiction of these elements may be exaggerated for clarity, illustration, and convenience.

DETAILED DESCRIPTION

The following detailed description is provided to assist the reader in gaining a comprehensive understanding of the methods, apparatuses, and/or systems described herein. Accordingly, various changes, modifications, and equivalents of the methods, apparatuses, and/or systems described herein will be suggested to those of ordinary skill in the art. The progression of processing steps and/or operations described is an example; however, the sequence of and/or operations is not limited to that set forth herein and may be changed as is known in the art, with the exception of steps and/or operations necessarily occurring in a particular order. In addition, respective descriptions of well-known functions and constructions may be omitted for increased clarity and conciseness.

Figure 1:
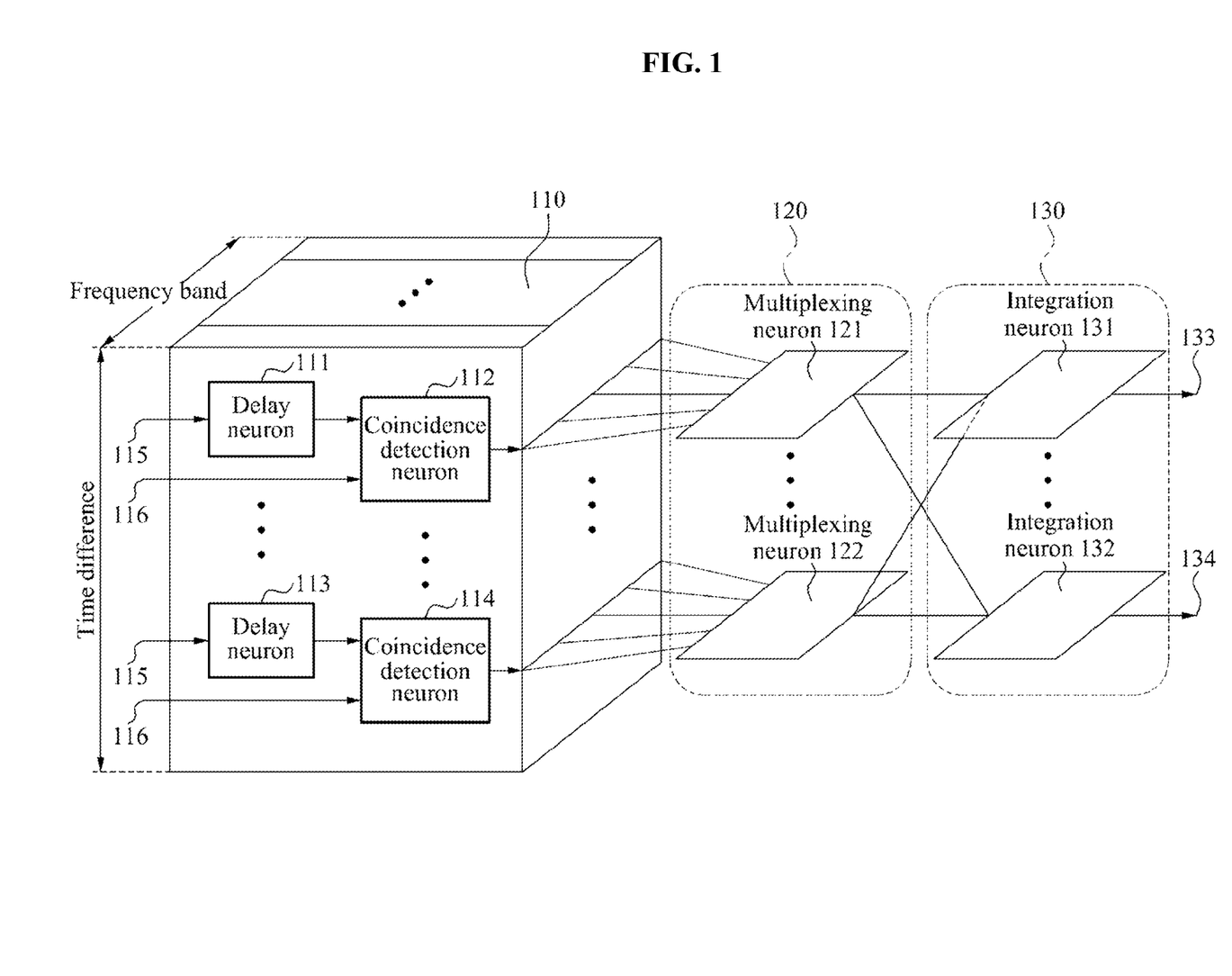
FIG. 1 is a block diagram illustrating a neuromorphic signal processing device for locating a sound source using a plurality of neuron circuits according to exemplary embodiments.

FIG. 1 is a block diagram illustrating a neuromorphic signal processing device for locating a sound source using a plurality of neuron circuits according to exemplary embodiments.

Referring to FIG. 1, the neuromorphic signal processing device may include a detector 110, a multiplexing unit 120 (e.g., multiplexor), and an integration unit 130 (e.g., integrator).

According to exemplary embodiments, the neuromorphic signal processing device is a device using a very-large-scale integration (VLSI) circuit including an analog circuit which imitates a neurobiological structure, and may include, for example, a leaky-integrate-fire (LIF) neuron circuit which imitates a neuron using an action potential in a neurobiological structure, and the like.

The detector 110 may receive an input of a spiking signal 115 included in a first signal and a spiking signal 116 included in a second signal. Here, the first signal and the second signal may refer to signals generated simultaneously from an identical sound source. For example, the first signal may correspond to a signal input by a microphone corresponding to a left ear, and the second signal may correspond to a signal input by a microphone corresponding to a right ear.

According to exemplary embodiments, a spiking signal may refer to a signal imitating a membrane potential which activates cells in a neurobiological structure. For example, when a signal in a predetermined frequency band is included in a received audio signal, the spiking signal may include a signal having a form of a spike output by a neuron circuit corresponding to the predetermined frequency band, and the like.

In this instance, the detector 110 may output a detected spiking signal using a coincidence detection neuron circuit corresponding to a predetermined time difference in response to determining that the first signal and the second signal contain an identical input spiking signal with respect to the predetermined time difference, in each of a plurality of predetermined frequency bands. Hereinafter, according to exemplary embodiments, the plurality of predetermined frequency bands may include sixty-four channels belonging to an audible frequency band. In addition, it would be understood by those skilled in the art that an example of identical input spiking signals may include an example of input spiking signals substantially identical in terms of intensity or waveform, and the like.

In particular, the detector 110 may include a delay neuron circuit 111 to delay the input spiking signal 115 included in the first signal for a time period corresponding to a first time difference, for example, 2.5 microseconds (µs), and a delay neuron circuit 113 to delay the input spiking signal 115 included in the first signal for a time period corresponding to a second time difference, for example, 500 µs, for each of the plurality of predetermined frequency bands.

In addition, the detector 110 may include a coincidence detection neuron circuit 112 to output the detected spiking signal when the first signal delayed by the delay neuron circuit 111 and the second signal contain the identical input spiking signal at an identical point in time, and a coincidence detection neuron circuit 114 to output the detected spiking signal when the first signal delayed by the delay neuron circuit 113 and the second signal contain the identical input spiking signal at an identical point in time, for each of the plurality of predetermined frequency bands.

For example, the coincidence detection neuron circuit 112 may output the detected spiking signal when the input spiking signal included in the first signal delayed by the delay neuron circuit 111 and the input spiking signal included in the second signal are input simultaneously. Similarly, the coincidence detection neuron circuit 114 may output the detected spiking signal when the input spiking signal included in the first signal delayed by the delay neuron circuit 113 and the input spiking signal included in the second signal are input simultaneously.

In particular, the detector 110 may detect a time difference between a time at which the input spiking signal included in the first signal is input and a time at which the input spiking signal included in the second signal is input, for each of the plurality of predetermined frequency bands.

According to other exemplary embodiments, the detector 110 may be configured such that a plurality of delay neuron circuits are connected, in a chain, the plurality of delay neuron circuits being configured to delay a signal for a time period corresponding to the predetermined time difference, for example, 2.5 μs, and tap an output of each delay neuron circuit, thereby utilizing a delayed signal for a desired time period. Such a structure will be described in detail with reference to FIG. 2.

From the description provided above, it would be understood by those skilled in the art that the exemplary embodiments can be readily modified so as to use a portion of a plurality of delay neurons included in the detector 110 to delay the first signal, and to use remaining delay neurons to delay the second signal. For example, in order to detect time differences between the first signal and the second signal in 5-μs units in a range of −500 μs to +500 μs, for each of the plurality of predetermined frequency bands, one hundred delay neurons may be used to delay the first signal, and the other hundred delay neurons may be used to delay the second signal. According to exemplary embodiments, the term "detection neuron circuit" may refer to a combination of a delay neuron circuit and a coincidence detection neuron circuit.

The multiplexing unit 120 may receive an input of a plurality of detected spiking signals output from the detector 110.

According to exemplary embodiments, the multiplexing unit 120 may output a multiplexed spiking signal corresponding to the predetermined time difference, based on the plurality of detected spiking signals received from the detector 110. In particular, the multiplexing unit 120 may include a plurality of multiplexing neuron circuits corresponding to the plurality of predetermined time differences.

For example, a multiplexing neuron circuit 121 may correspond to a neuron circuit corresponding to the first time difference, for example, 2.5 μs. As described above, the detector 110 may output the plurality of detected spiking signals using neuron circuits corresponding to the first time difference, for example, 2.5 μs, for the plurality of predetermined frequency bands.

The multiplexing neuron circuit 121 may generate a single multiplexed spiking signal based on the plurality of detected spiking signals corresponding to the first time difference, for example, 2.5 μs, and output the generated multiplexed spiking signal.

Similarly, a multiplexing neuron circuit 122 may correspond to a neuron circuit corresponding to the second time difference, for example, 500 μs. As described above, the detector 110 may output the plurality of detected spiking signals, using neuron circuits corresponding to the second time difference, for example, 500 μs, for the plurality of predetermined frequency bands.

The multiplexing neuron circuit 122 may generate a single multiplexed spiking signal based on the plurality of detected spiking signals corresponding to the second time difference, for example, 500 μs, and output the generated multiplexed spiking signal.

In particular, the multiplexing unit 120 may receive an M×N number of detected spiking signals output in an M number of frequency bands and with respect to an N number of time differences, respectively. The multiplexing unit 120 may combine the received M×N number of detected spiking signals based on signals corresponding to an identical time difference, thereby generating an N number of multiplexed spiking signals. The multiplexing unit 120 may perform such multiplexing, using an N number of multiplexing neuron circuits.

The integration unit 130 may receive an input of a plurality of multiplexed spiking signals output from the multiplexing unit 120.

According to exemplary embodiments, the integration unit 130 may output an integrated spiking signal corresponding to the predetermined time difference, based on the plurality of multiplexed spiking signals corresponding to the plurality of predetermined time differences.

According to exemplary embodiments, each of the plurality of integrated spiking signals corresponding to the plurality of predetermined time differences may be mapped to a direction of the sound source. In particular, when an integrated spiking signal corresponding to the predetermined time difference is output, the neuromorphic signal processing device may estimate that the first signal and the second signal are generated from the direction of the sound source to which the corresponding integrated spiking signal is mapped.

In particular, the integration unit 130 may include a plurality of integration neuron circuits corresponding to the plurality of predetermined time differences. For example, an integration neuron circuit 131 may correspond to a neuron circuit corresponding to the first time difference, for example, 2.5 μs.

The integration neuron circuit 131 may receive the multiplexed spiking signal output from the multiplexing neuron circuit 121 corresponding to the first time difference, for example, 2.5 μs, and the multiplexed spiking signal output from the multiplexing neuron circuit 122 corresponding to the second time difference, for example, 500 μs.

In this instance, the integration neuron circuit 131 may be connected to the multiplexing neuron circuit 121 through an excitatory synapse and receive the multiplexed spiking signal output from the multiplexing neuron circuit 121 through the excitatory synapse, and be connected to remaining multiplexing neuron circuits other than the multiplexing neuron circuit 121 through respective inhibitory synapses and receive multiplexed spiking signals output from the remaining multiplexing neuron circuits through the respective inhibitory synapses.

According to exemplary embodiments, the integration neuron circuit 131 may process the multiplexed spiking signal connected through the excitatory synapse as a positive (+) value, and process the plurality of multiplexed spiking signals connected through the inhibitory synapse as a negative (−) value.

In particular, the integration neuron circuit 131 may deduct the plurality of multiplexed spiking signals connected through the inhibitory synapse from the multiplexed spiking signal connected through the excitatory synapse, thereby generating the integrated spiking signal corresponding to the first time difference, for example, 2.5 μs.

The integration neuron circuit 131 may output an integrated spiking signal 133 corresponding to the first time difference, for example, 2.5 μs, when a value obtained by deducting a sum of intensities of the plurality of multiplexed spiking signals connected through the inhibitory synapse from an intensity of the multiplexed spiking signal connected through the excitatory synapse is greater than a spiking threshold voltage of the integration neuron circuit 131.

Conversely, when the value obtained by deducting the sum of intensities of the plurality of multiplexed spiking signals connected through the inhibitory synapse from the intensity of the multiplexed spiking signal connected through the excitatory synapse is less than the spiking threshold voltage of the integration neuron circuit 131, an integrated spiking signal may not be output by the integration neuron circuit 131.

It would be understood by those skilled in the art that a case of the integration neuron circuit 131 not outputting the integrated spiking signal may be identical to a case of a signal output from the integration neuron circuit 131 substantially having a value of "0".

In addition, the integration neuron circuit 131 may adaptively adjust a connection strength of the inhibitory synapse. In particular, the integration neuron circuit 131 may apply difference weights to the plurality of multiplexed spiking signals connected through the inhibitory synapse.

For example, among time differences other than the first time difference, a multiplexed spiking signal corresponding to a time difference relatively distant from the first time difference may have a greater connection strength when compared to a multiplexed spiking signal corresponding to a time difference relatively closer to the first time difference.

For example, a distance between the first time difference, for example, 2.5 μs, and the second time difference, for example, 500 μs, may be longer than a distance between the first time difference, for example, 2.5 μs, and a third time difference, for example, 10 μs.

In particular, the integration neuron circuit 131 may decrease a connection strength of the inhibitory synapse with respect to a multiplexed spiking signal corresponding to the third time difference, for example, 10 μs, which is relatively close in value to the first time difference, for example, 2.5 μs, and increase the connection strength of the inhibitory synapse with respect to a multiplexed spiking signal corresponding to the second time difference, for example, 500 μs, which is relatively distant in value from the first time difference, for example, 2.5 μs.

The integration neuron circuit 131 may apply a relatively great weight to a multiplexed spiking signal connected through an inhibitory synapse of which a connection strength is relatively great. Accordingly, the integration neuron circuit 131 may increase a reliability of spiking signals detected in an area in which time differences are similar, and decrease a reliability of spiking signals detected in an area in which time differences are significantly different.

An integration neuron circuit 132 may receive the multiplexed spiking signal output from the multiplexing neuron circuit 122 through the excitatory synapse, and receive multiplexed spiking signals output from remaining multiplexing neuron circuits other than the multiplexing neuron circuit 122 through the inhibitory synapse.

Similarly, the integration neuron circuit 132 may output an integrated spiking signal 134 corresponding to the second time difference, for example, 500 μs, when a value obtained by deducting a sum of intensities of the plurality of multiplexed spiking signals connected through the inhibitory synapse from an intensity of the multiplexed spiking signal connected through the excitatory synapse is greater than a spiking threshold voltage of the integration neuron circuit 132.

As described above, the neuromorphic signal processing device may provide signal processing technology using neuron circuits corresponding to analog circuits imitating a neurobiological structure in order to locate a sound source.

Accordingly, exemplary embodiments make it possible to implement a signal processing device for locating a sound source using a much fewer number of transistors, when compared to a case of a digital circuit being used. As a result, the neuromorphic signal processing device may operate with a low power, for example, a power below tens of milliwatts (mW). In addition, the neuromorphic signal processing device according to exemplary embodiments may operate at a high speed, for example, a response speed below sub-millisecond, when compared to a case of a digital circuit being used.

Figure 2:
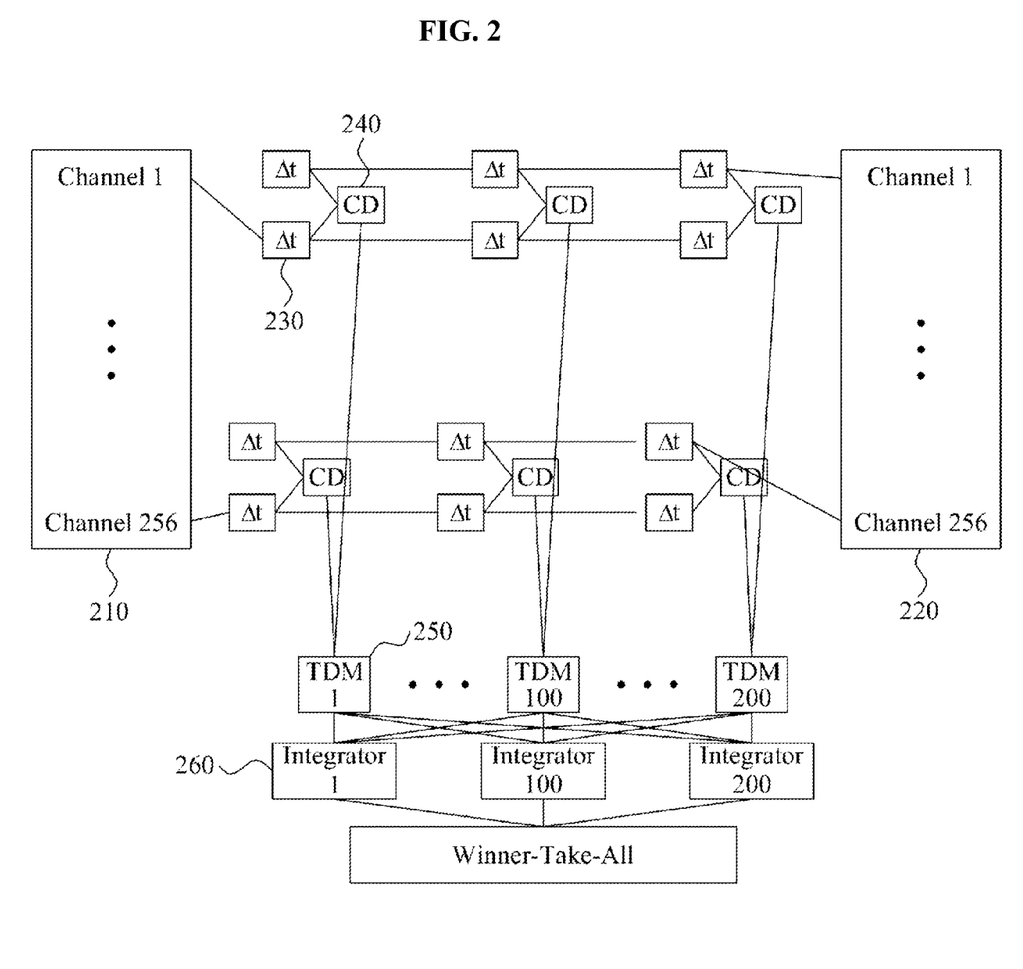
FIG. 2 is a block diagram illustrating a neuromorphic signal processing device for locating a sound source using a plurality of neuron circuits according to other exemplary embodiments.

FIG. 2 is a block diagram illustrating a neuromorphic signal processing device for locating a sound source using a plurality of neuron circuits according to other exemplary embodiments.

Referring to FIG. 2, the neuromorphic signal processing device may further include an input unit, in addition to the detector, the multiplexing unit, and the integration unit described with reference to FIG. 1.

The input unit may include a first silicon cochlea 210 to receive a first signal and to generate a plurality of input spiking signals corresponding to a plurality of frequency bands based on the first signal, and a second silicon cochlea 220 to receive a second signal and to generate a plurality of input spiking signals corresponding to a plurality of frequency bands based on the second signal.

According to exemplary embodiments, the silicon cochlea may be a device which imitates a cochlea in an ear of a human. The silicon cochlea may include, for example, a neuromorphic circuit designed to output input spiking signals for each frequency component included in a sound source when the corresponding sound source is sensed.

It would be understood by those skilled in the art that a configuration including at least three silicon cochleae may be readily derived from a configuration including two silicon cochleae.

A plurality of frequency channels, for example, 256 channels, may be implemented in each of the first silicon cochlea 210 and the second silicon cochlea 220. According to exemplary embodiments, the plurality of frequency channels may correspond to different frequency bands, respectively, in an audible frequency band.

When a sound source is sensed by the first silicon cochlea 210 and the second silicon cochlea 220, the first silicon cochlea 210 and the second silicon cochlea 220 may output input spiking signals at different times, respectively, based on a direction of the sound source.

In order to measure a difference between the times, a delay neuron circuit 230, a coincidence detection neuron circuit 240, a multiplexing neuron circuit 250, and an integration neuron circuit 260 may be used. The description provided with reference to FIG. 1 may be applied identically to the delay neuron circuit 230, the coincidence detection neuron circuit 240, the multiplexing neuron circuit 250, and the integration neuron circuit 260. Alternatively, one or more of the delay neuron circuit 230, the coincidence detection neuron circuit 240, the multiplexing neuron circuit 250, and the integration neuron circuit 260 may be implemented in a different fashion from the corresponding components described in FIG. 1

Concisely, each of the delay neuron circuit 230, the coincidence detection neuron circuit 240, the multiplexing neuron circuit 250, and the integration neuron circuit 260 may be implemented by LIF neuron circuits.

The delay neuron circuit 230 may uniformly delay input spiking signals output by a silicon cochlea. For example, in order to measure a time difference of about 500 μs, a total of 200 delay neuron circuits corresponding to 2.5 μs may be implemented for each channel.

The coincidence detection neuron circuit 240 may detect a time difference corresponding to the input spiking signals delayed by the delay neuron circuit 230. For example, in order to measure a time difference of about 500 μs at 2.5-μs intervals, 200 coincidence detection neuron circuits may be implemented for each channel.

The multiplexing neuron circuit 250 may receive an input of detected spiking signals output from the coincidence detection neuron circuit 240. The multiplexing neuron circuit 250 may combine detected spiking signals corresponding to each time difference into a single multiplexed spiking signal.

For example, in order to measure a time difference of about 500 µs at 2.5-µs intervals, a total of 200 multiplexing neuron circuits may be implemented.

The integration neuron circuit 260 may receive an input of multiplexed spiking signals output from the multiplexing neuron circuit 250. The integration neuron circuit 260 may be connected to the multiplexing neuron circuit 250 of an identical index through an excitatory synapse, and be connected to multiplexing neuron circuits of different indices through an inhibitory synapse. For example, in order to measure a time difference of about 500 µs at 2.5-µs intervals, a total of 200 integration neuron circuits may be implemented.

In this instance, each of the plurality of integration neuron circuits may be mapped to a direction angle of the sound source.

Figure 3:
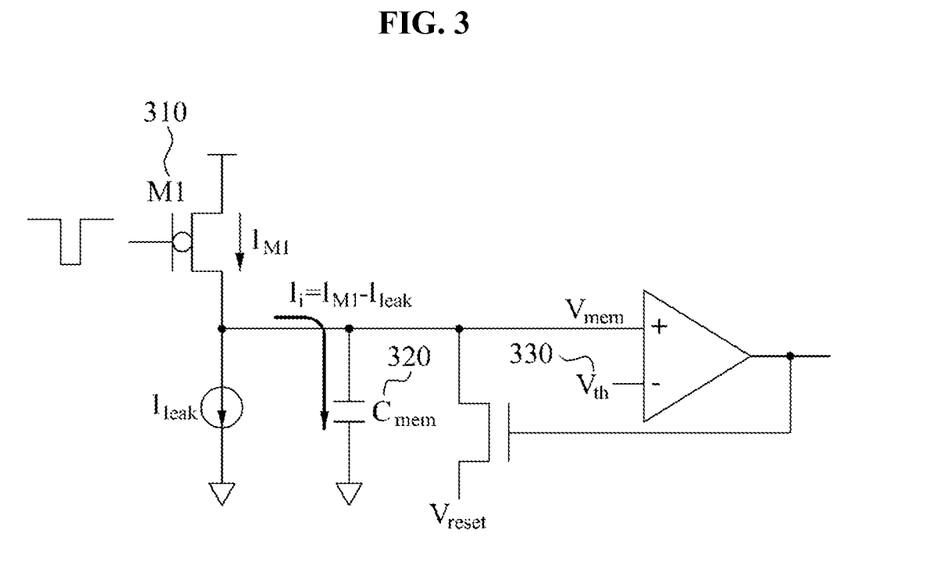
FIG. 3 is a diagram illustrating a neuron circuit included in a neuromorphic signal processing device according to exemplary embodiments.

FIG. 3 is a diagram illustrating a neuron circuit included in a neuromorphic signal processing device according to exemplary embodiments.

Referring to FIG. 3, the neuron circuit may be implemented by an LIF neuron circuit.

The neuron circuit may operate similarly to a neuron using an action potential in a neurobiological structure.

In particular, the neuron circuit may be controlled by a transistor M1 310. When the transistor M1 310 is turned ON, a current $I_{M1}$ may flow through the transistor M1 310.

In this instance, a current $I_{leak}$ may be leaked to a ground GND, and a current $I_{M1} - I_{leak}$ may be accumulated as an electric charge of a membrane capacitor. As the electric charge is accumulated in the membrane capacitor, a membrane voltage $V_{mem}$ may increase. When the membrane voltage $V_{mem}$ is greater than a threshold voltage $V_{th}$, the neuron circuit may output a signal.

In this instance, a transistor connected to a reset voltage $V_{reset}$ by the output signal may be turned ON, and the charge accumulated in the membrane capacitor may be reset to the reset voltage $V_{reset}$.

The neuron circuit may be controlled by a single transistor, for example, the transistor M1 310 and thus, a synapse time constant of a µs unit may be obtained. Accordingly, the neuron circuit according to exemplary embodiments may achieve a fast operating speed.

In addition, the neuron circuit according to exemplary embodiments may change a capacity $C_{mem}$ 320 of the membrane capacitor, thereby adjusting a membrane time constant. For example, when a membrane capacitor having a capacity below a few nanofarads (nF) is used, a membrane time constant of a µs unit may be obtained.

Figure 4:
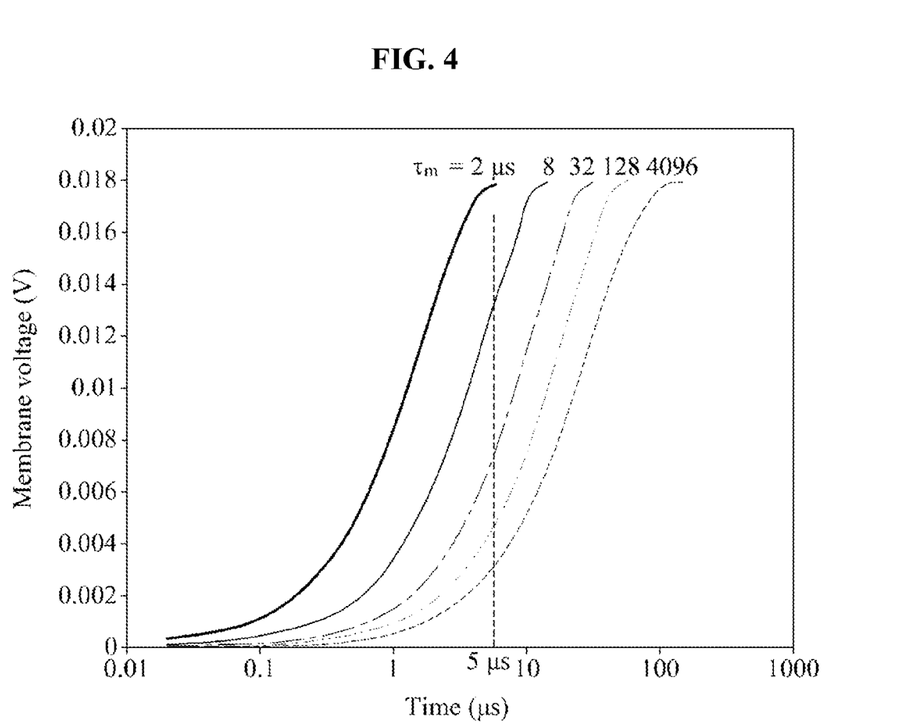
FIG. 4 is a graph illustrating an operational characteristic of a delay neuron circuit according to exemplary embodiments.

FIG. 4 is a graph illustrating an operational characteristic of a delay neuron circuit according to exemplary embodiments.

Referring to FIG. 4, the delay neuron circuit may set a threshold voltage $V_{th}$ 330 of FIG. 3 to 18 millivolts (mV) when a membrane time constant corresponds to 2 µs, thereby obtaining a delay time of about 5 µs.

Accordingly, it would be understood by those skilled in the art that a delay time of the delay neuron circuit may be adjusted arbitrarily by adjusting a value of a threshold voltage.

Figure 5:
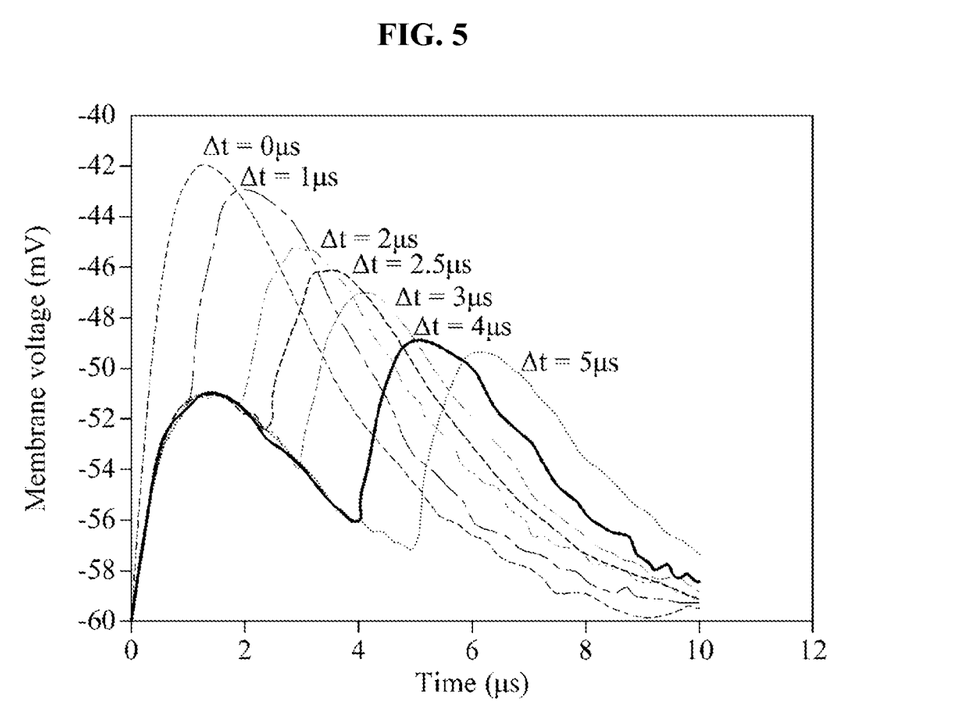
FIG. 5 is a graph illustrating an operational characteristic of a coincidence detection neuron circuit according to exemplary embodiments.

FIG. 5 is a graph illustrating an operational characteristic of a coincidence detection neuron circuit according to exemplary embodiments.

Referring to FIG. 5, the coincidence detection neuron circuit may output a membrane potential decreasing based on a time difference when the corresponding time difference is present between currents generated by two input spiking signals.

Accordingly, the coincidence detection neuron circuit may change a threshold voltage to adjust a detection resolution.

For example, the threshold voltage of the coincidence detection neuron circuit may be set to −50 mV. In this instance, when the time difference between the two input spiking signals is less than or equal to 5 µs, the coincidence detection neuron circuit may perform a coincidence detection operation.

Figure 6:
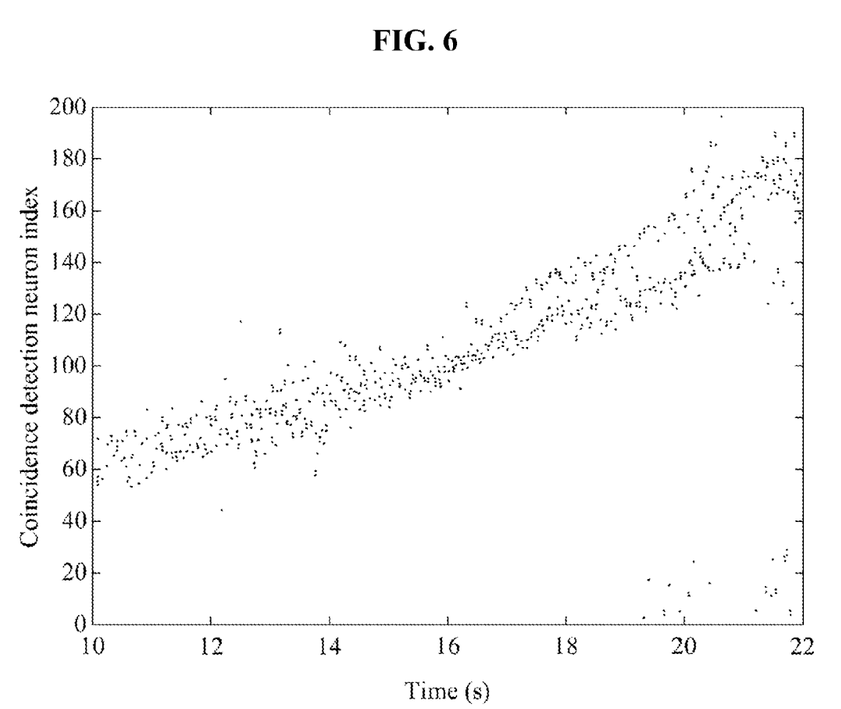
FIGS. 6 and 7 are graphs illustrating a detected spiking signal output by a coincidence detection neuron circuit according to exemplary embodiments.
Figure 7:
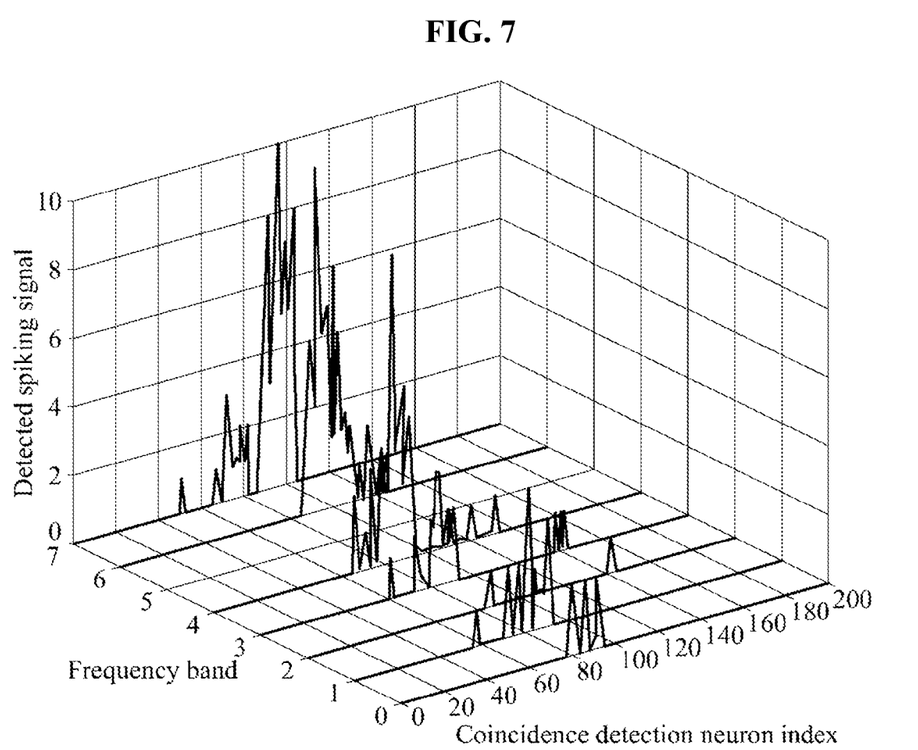

FIGS. 6 and 7 are graphs illustrating a detected spiking signal output by a coincidence detection neuron circuit according to exemplary embodiments.

FIG. 6 shows an output of a coincidence detection neuron circuit corresponding to a channel 136, for example, 910 hertz (Hz). For example, when a direction of a sound source is moved from left to right, an index of the coincidence detection neuron circuit which outputs a detected spiking signal may be changed.

FIG. 7 shows a distribution of a coincidence detected spiking signal measured in each frequency band. In each frequency band, coincidence detection neuron circuits of indices 60 to 140 may output coincidence detected spiking signals. A strongest detected spiking signal may be measured at an index 90, of a frequency band 7.

In particular, referring to FIG. 7, all sound sources corresponding to frequency bands 1 to 7 may be included in each of a first signal and a second signal. Among the sound sources, a sound source corresponding to the frequency band 7 may be included the most in each of the first signal and the second signal.

Further, the first signal and the second signal may be received, respectively, at times having a difference which corresponds to indices 60 to 140.

As described above, a multiplexing neuron circuit according to exemplary embodiments may generate a multiplexed spiking signal by combining detected spiking signals of a plurality of frequency bands, in each coincidence detection neuron index. For example, a multiplexing neuron circuit of the indices 60 to 140 may generate a multiplexed spiking signal having a value other than "0".

An integration neuron circuit according to exemplary embodiments may be connected to a multiplexing neuron circuit of an identical index through an excitatory synapse, and be connected to multiplexing neuron circuits of different indices through an inhibitory synapse. A connection strength of the inhibitory synapse may be adaptively adjusted based on a difference in an index number.

For example, since a multiplexing neuron circuit of the index 90 may output a strongest multiplexed spiking signal, an integration neuron circuit of the index 90 may output an integrated spiking signal having a value other than "0".

An integration neuron circuit of an index 130 may receive an input of a multiplexed spiking signal from a multiplexing neuron circuit of the index 130. However, since the integration neuron circuit of the index 130 may be connected to the multiplexing neuron circuit of the index 90 through the inhibitory synapse, the integration neuron circuit of the index 130 may not output an integrated spiking signal.

Accordingly, the neuromorphic signal processing device according to exemplary embodiments may estimate that a sound source occurs at a direction angle mapped to the integration neuron circuit of the index 90.

The above-described exemplary embodiments may be recorded in non-transitory computer-readable media including program instructions to implement various operations embodied by a computer. The media may also include, alone or in combination with the program instructions, data files, data structures, and the like. Examples of non-transitory computer-readable media include magnetic media such as hard disks, floppy disks, and magnetic tape; optical media such as CD ROM discs and DVDs; magneto-optical media such as optical discs; and hardware devices that are specially configured to store and perform program instructions, such as read-only memory (ROM), random access memory (RAM), flash memory, and the like. Examples of program instructions include both machine code, such as code produced by a compiler, and files containing higher level code that may be executed by the computer using an interpreter. The described hardware devices may be configured to act as one or more software modules in order to perform the operations of the above-described exemplary embodiments, or vice versa.

A number of exemplary embodiments have been described above. Nevertheless, it should be understood that various modifications may be made. For example, suitable results may be achieved if the described techniques are performed in a different order and/or if components in a described system, architecture, device, or circuit are combined in a different manner and/or replaced or supplemented by other components or their equivalents. Accordingly, other implementations are within the scope of the following claims.

What is claimed is:

1. A neuromorphic signal processing device for locating a sound source using a plurality of neuron circuits, the device comprising:
    a detector configured to output a detected spiking signal using a detection neuron circuit corresponding to a predetermined time difference, in response to a first signal and a second signal containing an identical input spiking signal with respect to the predetermined time difference, for each of a plurality of predetermined frequency bands;
    a multiplexor configured to output a multiplexed spiking signal corresponding to the predetermined time difference based on a plurality of the detected spiking signals output from a plurality of neuron circuits corresponding to the plurality of frequency bands; and
    an integrator configured to output an integrated spiking signal corresponding to the predetermined time difference, based on a plurality of the multiplexed spiking signals corresponding to a plurality of predetermined time differences,
    wherein the predetermined time difference corresponds to one of the plurality of predetermined time differences.

2. The device of claim 1, wherein the first signal and the second signal are generated simultaneously from an identical sound source.

3. The device of claim 1, further comprising:
    an input unit configured to receive the first signal and the second signal, to generate a plurality of input spiking signals corresponding to the plurality of frequency bands based on the first signal, and to generate another plurality of input spiking signals corresponding to the plurality of frequency bands based on the second signal.

4. The device of claim 1, wherein the detection neuron circuit comprises:
    a delay neuron circuit configured to delay an input spiking signal included in the first signal to thereby delay the first signal for a time period corresponding to the predetermined time difference; and
    a coincidence detection neuron circuit configured to output the detected spiking signal when the delayed first signal and the second signal contain the identical input spiking signal at an identical point in time.

5. The device of claim 1, wherein the multiplexor outputs the multiplexed spiking signal using a multiplexing neuron circuit corresponding to the predetermined time difference.

6. The device of claim 1, wherein the integrator outputs the integrated spiking signal using an integration neuron circuit corresponding to the predetermined time difference.

7. The device of claim 1, wherein the integrator receives the multiplexed spiking signal corresponding to the predetermined time difference through an excitatory synapse, and receives multiplexed spiking signals corresponding to time differences other than the predetermined time difference through an inhibitory synapse in order to output the integrated spiking signal corresponding to the predetermined time difference.

8. The device of claim 7, wherein the integrator is connected, through the inhibitory synapse, more strongly to a multiplexed spiking signal corresponding to a time difference which is relatively distant from the predetermined time difference as compared to a multiplexed spiking signal corresponding to a time difference which is relatively close to the predetermined time difference, among the time differences other than the predetermined time difference.

9. The device of claim 1, wherein each of a plurality of the integrated spiking signals corresponding to the plurality of time differences is mapped to a direction of the sound source.

10. The device of claim 1, wherein the plurality of frequency bands corresponds to frequency bands within an audible frequency band.

11. The device of claim 1, wherein each of the plurality of neuron circuits comprises a neuron circuit using a leaky integrate-and-fire (LIF) model.

12. A neuromorphic signal processing method of locating a sound source using a plurality of neuron circuits, the method comprising:
    outputting a detected spiking signal using a detection neuron circuit corresponding to a predetermined time difference, in response to a first signal and a second signal containing an identical input spiking signal with respect to the predetermined time difference, for each of a plurality of predetermined frequency bands;
    outputting a multiplexed spiking signal corresponding to the predetermined time difference, using a multiplexing neuron circuit corresponding to the predetermined time difference, based on a plurality of the detected spiking signals output from a plurality of neuron circuits corresponding to the plurality of frequency bands; and
    outputting an integrated spiking signal using an integration neuron circuit corresponding to the predetermined time difference, based on a plurality of the multiplexed spiking signals corresponding to a plurality of predetermined time differences,
    wherein the predetermined time difference corresponds to one of the plurality of predetermined time differences.

13. The method of claim 12, wherein the outputting of the integrated spiking signal comprises outputting the integrated spiking signal corresponding to the predetermined time difference using a synapse scheme of receiving a multiplexed spiking signal corresponding to the predetermined time difference through an excitatory synapse, and receiving multiplexed spiking signals corresponding to time differences other than the predetermined time difference through an inhibitory synapse,
    wherein the outputting of the integrated spiking signal comprises using the synapse scheme of connecting, through the inhibitory synapse, an integrator more strongly to a multiplexed spiking signal corresponding to a time difference which is relatively distant from the predetermined time difference as compared to a multiplexed spiking signal corresponding to a time difference which is relatively close to the predetermined time difference, among the time differences other than the predetermined time difference.

14. A signal processing device, comprising:
a plurality of multiplexing neuron circuits configured to respectively output a multiplexed spiking signal based on a plurality of spiking signals; and
a plurality of integration neuron circuits configured to respectively output an integrated spiking signal based on a plurality of the multiplexed spiking signals,
wherein the integration neuron circuits are connected to the multiplexing neuron circuits via synapses which vary in type and connection strength.

15. The signal processing device according to claim 14, further comprising: a plurality of detection neuron circuits which receive an input signal, respectively delay the input signal by a predetermined time delay, and respectively output the delayed signal as one of the plurality of spiking signals.

16. The signal processing device according to claim 15, wherein each of the plurality of spiking signals corresponds to a respective index, and
each index respectively corresponds to one of the multiplexing neuron circuits and one of the integration neuron circuits.

17. The signal processing device according to claim 16, wherein each integration neuron circuit is connected to a multiplexing neuron circuit of the same index via an excitatory synapse, and is connected to other multiplexing neuron circuits of different indices via inhibitory synapses.

18. The signal processing device according to claim 17, wherein, for each integration neuron circuit connected to a multiplexing neuron circuit via an inhibitory synapse, a connection strength of the inhibitory synapse varies based on a difference in index numbers between the integration neuron circuit and the multiplexing neuron circuit,
wherein the connection strength increases as the difference in index numbers increases.

19. The signal processing device according to claim 15, further comprising an input unit configured to receive the input signal, wherein the input unit comprises a first silicon cochlea configured to receive a first signal and to generate a plurality of the spiking signals corresponding to a plurality of frequency bands based on the first signal, and a second silicon cochlea configured to receive a second signal and to generate a plurality of the spiking signals corresponding to a plurality of frequency bands based on the second signal.

20. The signal processing device according to claim 14, wherein each of the multiplexing neuron circuits is configured to respectively output a multiplexed spiking signal for a plurality of frequency bands.

* * * * *